United States Patent Office 3,095,263
Patented June 25, 1963

3,095,263
METHOD AND COMPOSITION FOR INHIBITING EVAPORATION OF WATER
George W. Eckert, Wappingers Falls, and Kenneth M. Hall, Beacon, N.Y., assignors to Texaco Inc., New York, N.Y., a corporation of Delaware
No Drawing. Filed Dec. 27, 1961, Ser. No. 162,551
14 Claims. (Cl. 21—60.5)

This invention relates to a method for inhibiting the evaporation of water, and in its more specific aspect to a method for conserving water in reservoirs and the like by forming a vapor barrier film on the exposed surface of the water.

In many geographical areas, particularly arid or semi-arid regions where adequate sources of water are limited or lacking altogether, conservation of water is of major importance. It recently has been proposed to add a chemical agent or composition to the water such as cetyl alcohol, which forms a film on the exposed surface of the water thereby inhibiting evaporation. For such purposes, it is essential that the chemical composition spreads relatively rapidly and uniformly over the surface of the water thereby forming a substantially continuous film. Moreover, the chemical composition should retain its film-like characteristics for a reasonable period of time to render the agent practicable for use. In addition, these film-forming compositions have potentially extensive use and therefore should be economically attractive.

This invention has therefore as a principal object to provide a method for inhibiting the evaporation of water in reservoirs and the like by forming on the exposed surface of the water a vapor barrier film which is substantially continuous.

It is another object of the invention to provide in a method of the above type a film-forming composition which, upon application to the water, spreads relatively rapidly thereby forming a vapor barrier film.

In accordance with our invention, there is applied to the water a film-forming composition which upon contact with the water forms a vapor barrier film on the exposed surface of the water. The film-forming composition consists essentially of wax which is normally solid at room temperature, mineral oil and a relatively light hydrocarbon and preferably also an oxidate material. The film-forming composition, upon contact with water in the reservoir, spreads relatively rapidly on the surface of the water thereby forming a vapor barrier film. The resulting vapor barrier film is substantially continuous, and is characterized by a high degree of stability and flexibility thereby retaining its film-like characteristics for a reasonably long period of time.

The wax employed in the film-forming composition is normally solid at room temperaute and may include mineral or petroleum waxes, for example paraffin wax derived from the lighter fractions in the distillation of petroleum, or microcrystalline wax obtained from the dewaving of heavy distillate or residual lubricating oils. Also, natural occurring waxes such as beeswax, carnauba wax, spermaceti, candelilla, japan wax, montan wax, ouricury wax and ozocerite. However, petroleum waxes are more readily available and generally more economical than natural waxes, and therefore particularly suitable for use in our improved film-forming composition. The wax desirably has a melting point ranging from about 115° to 300° F., and more preferably about 120 to 185° F. It is apparent, however, that wax alone cannot be employed for providing a vapor barrier film on water inasmuch as a film of wax is relatively inflexible. Consequently, movement of the water such as caused by current or rippling on the surface will rupture or break the wax which in turn readily agglomerates. However, when the wax is dissolved in oil and light hydrocarbon, as described below in detail, the wax component provides stability and rigidity to the vapor barrier film.

In order to accomplish a flexible film, the wax is dissolved in a mineral lubricating oil. The oil component may be a naphthene base distillate, a paraffin base distillate or mixtures thereof, and must exhibit a relatively low rate of evaporation such that upon formation of vapor barrier film on the surface of the water the oil will not substantially vaporize. A mineral lubricating oil having an initial boiling point greater than 600° F., an S.U.S. viscosity at 100° F. between 40 and 1,000 and an A.P.I. gravity of between 25 and 34 has been found particularly satisfactory. Because of the importance in employing a mineral oil having a low evaporation rate, in the preferred embodiment the oil component has an initial boiling point above 650° F. Further, a highly viscous mineral oil deters spreading of the film forming composition on the surface of the water, and it therefore is preferred to employ a mineral oil having an S.U.S. viscosity at 100° F. between 50 and 800 and an A.P.I. gravity of between 26 and 32.

When oil alone is added to water, the oil forms relatively large droplets and will not easily spread as a film. When wax is dissolved in oil, the spreading properties may be reduced further. We have found that these disadvantages are overcome by adding to the oil-wax solution a relatively light hydrocarbon which is substantially immiscible with water. Thus, the addition of a light hydrocarbon provides a sufficiently fluid composition which upon contact with water spreads rapidly over the surface thereby forming a substantially continuous vapor barrier film. The chief function of the light hydrocarbon is to facilitate spreading of the film on the surface of the water. However, upon formation of the film the light hydrocarbon may evaporate, and it is therefore essential that the light hydrocarbon exhibit a sufficiently high boiling point to permit spreading of the film before evaporation occurs. It therefore is desirable to employ a light hydrocarbon having not lesss than 5 carbon atoms in the molecule, and more preferably between 6 and 16 carbon atoms per molecule. The light hydrocarbon having a boiling point range of from about 90 to 700° F. and more preferably 100 to 500° F. is found particularly desirable, and may include paraffins, olefins, naphthenes, aromatics, or mixtures thereof. For example, suitable results may be obtained using pentane, hexane, heptane, benzene, toluene, diisobutylene, straight run naphthas, cracked naphthas, kerosine, propylene polymer (dimer, trimer and tetramers), reformates, alkylates, light gas oils, and Stoddard solvent.

A particularly suitable vapor barrier film is formed when using wax and mineral oil in the ratio of between 20:1 to 1:20. However, the wax component provides the principal barrier against the transmission of water vapor, and therefore is more desirably employed in equal proportions with oil or as the major component. In the preferred embodiment, the ratio of wax to mineral oil is between 10:1 to 1:1. Slack wax obtained upon dewaxing of a lubricating oil and comprising about 5 to 40% by weight oil may be employed as an economical source of wax and oil.

The wax plus oil combination in the three-component film-forming composition comprises not less than 0.5 percent by volume, the balance being light hydrocarbon, in order to provide a film-forming composition of sufficient density. It is more preferable to employ not less than 1 percent by volume of wax and oil, and desirably from about 1 to 25 percent by volume, the balance being light hydrocarbon. When less than the described minimum of wax plus oil is used, the barrier film formed will not be sufficiently retentive to be practicable. The film-forming composition containing more than 25 percent by volume of wax and oil is highly viscous and therefore will not spread rapidly nor uniformly.

The spreading characteristics of the film-forming composition may be augmented by adding up to about 75% by volume (based on wax plus oil in the composition) of oxidate material of prescribed properties selected from the group consisting of an ester-type oxidate derived from deoiled macrocrystalline wax and an oxidate derived from a paraffinic lubricating oil. The oxidate material having a polar carboxyl group or groups exhibits an affinity for water thereby resulting in the desired spreading of the film forming material. The oxidate material may be incorporated in the wax and mineral oil in the ratio of between 0.01:1 to 2:1 of oxidate material to wax plus oil, and more preferably between 0.1:1 to 1:1.

The ester-type oxidate component usually has a Neutralization No. 70 and 95, a Saponification No. between 210 and 250, a Neutralization No. to a Saponification No. ratio between 0.3 and 0.4 and an unsaponifiable content between 30 and 35 percent, and is obtained by air oxidation of a deoiled macrocrystalline wax of 25 to 30 carbon atoms containing less than 5 percent oil and separated from a distillate lube oil fraction of SAE 10 to 30 grade by dewaxing.

The paraffinic oil oxidate preferably has a Neutralization No. between 60 and 80, a Saponification No. between 120 and 165, a viscosity less than 100 S.U.S. at 210° F., a Lovibond ½ inch cell color rating of less than about 100, and is obtained by air oxidation of a refined paraffin base lubricating oil having a viscosity between 140 and 180 S.U.S. at 100° F., a pour point less than 5° F., a color rating of less than 10, and an aniline point between 215 and 225° F.

Where deemed desirable, up to about 50% by weight of wax used in the film-forming composition may be replaced by an additive having prescribed properties which improves or enhances the water vapor transmission resistance and plasticity of the vapor barrier film. The additives should have low volatility such that upon formation of the vapor barrier film the additive will not substantially vaporize. In addition, the additive should be substantially soluble in the mineral oil and the light hydrocarbon employed in the film-forming composition, and be substantially insoluble in water. Thus, the wax may be substituted in part by a polymeric material; a polyvalent metal soap; alkyl-, aryl-, alkaryl- and aralkyl-carboxylic acids having not less than 7 carbon atoms per molecule, and preferably 7 to 22 carbon atoms; and an ester having not less than 8 carbon atoms per molecule and derived from monobasic acids or polybasic acids and from alcohols or polyhydric alcohols.

In greater detail, the film-forming composition may include a polymeric material which is soluble in the mineral oil and light hydrocarbon and may be liquid or solid consistency. Suitable polymeric materials include those selected from the group consisting of polyisobutylene having a molecular weight of at least 300, and preferably between 300 and 10,000; polyethylene having a molecular weight of at least 300, and preferably between 300 and 5,000; acryloid polymers having a molecular weight of at least 1,000, and preferably between 100,000 and 900,000; and polyvinyl ethers having a molecular weight of at least 500, and perferably between 1,000 and 10,000. Suitable acryloid polymers include, for example polymethyl methacrylate, polymethyl acrylate and butyl methacrylate. Polyvinyl ethers which may be satisfactorily employed include, for example, polyvinyl isobutyl ether, polyvinyl ethyl ether and polyvinyl propylether.

Examples of suitable polyvalent metal soaps which may be incorporated in the film-forming composition are aluminum stearate, aluminum palmitate, zinc oleate, zinc octoate, lead octoate, lead naphthenate, iron octoate, and copper naphthenate, and the like, the aluminum soaps and zinc soaps preferred. Suitable carboxylic acids which may be used are lauric acid, myristic acid, palmitic acid, stearic acid, benzoic acid, dimer of linoleic acid, naphthoic acid, toluic acid, phenylacetic acid and alkenyl succinic acid. Included among the esters which may be employed as an additive are methyl stearate, ethyl palmitate, cetyl propionate, stearyl acetate, phenol stearate, phenol oleate, glycerides, glycol esters, esters of polyethylene glycols, esters of polypropylene glycols, sorbitol esters, lanolin, cotton seed oil, esters of dibasic acids such as sebacic acid, succinic acid, maleic acid, dilinoleic acid, and the like.

The invention is further illustrated by the following examples.

EXAMPLE I

In order to illustrate the advantages of our invention, runs were made comparing the percent reduction in evaporation of water using a two-component film forming composition and the three-component film forming composition of this invention. In the first run, a one percent volume solution of paraffin wax having a melting point of 125–127° F. manufactured by Texaco Inc. and designated Texwax, was dissolved in normal pentane as the film spreading agent. In the second run, a one percent volume solution of mineral oil designated 100E pale oil having an A.P.I. gravity of 27 to 31, and S.U.S. at 100° F. of 96 and an initial boiling point of 684° F. was admixed with diisobutylene. In runs 3 and 4, the paraffin wax was dissolved in the oil in a 1:1 ratio, and the resulting solution was employed in a one percent volume solution in diisobutylene. In the remaining runs, slack wax containing about 15 percent by weight oil, was dissolved in a straight run naphtha having a boiling point range of 93 (I.B.P.) to 219 (E.P.) ° F. and obtained upon the distillation of mixed-base petroleum crude. The slack wax was employed in a one percent volume solution in a film spreading agent as shown in Table I, below. In evaluating the vapor inhibiting properties for each system each of the compositions was applied to 300 milliliters of water contained in a 400 milliliter beaker. The beakers were weighed to the nearest gram and allowed to stand uncovered at ambient temperatures, and reweighed at approximately 24 hour intervals to determine the amount of evaporation. In Table I, below, column 2 headed film-former designates the wax, the oil, or the wax plus oil employed for each run. The hydrocarbon film-spreading agent used in each run is shown in column 3, the amount of film-former spread on the surface of the water is set forth in column 4 and in column 5 the percent reduction of evaporation is shown.

*Table I*

| Run No. | Film Former | Film Spreading Agent | Amt. of Film Former, grams per sq. ft. | Percent Reduction of Evaporation |
|---|---|---|---|---|
| 1 | paraffin wax | n-pentane | 0.25 | 44.7 |
| 2 | oil | diisobutylene | 0.125 | 23.4 |
| 3 | wax oil | n-pentane | 0.25 | 61.5 |
| 4 | do | diisobutylene | 0.29 | 88.4 |
| 5 | do | do | 0.029 | 88.4 |
| 6 | slack wax | naphtha | 0.25 | 97.8 |
| 7 | do | do | 0.125 | 99.2 |
| 8 | do | do | 0.063 | 93.0 |

It will be observed from the table that a two-component system comprising wax and light hydrocarbon, or mineral oil and light hydrocarbon, does not inhibit the evaporation of water to as great a degree as the three-component composition of our invention comprising wax, oil and light hydrocarbon. It also is significant to note that the amount of film-former employed in our composition may be reduced substantially thereby resulting in a more economically attractive method.

EXAMPLE II

Comparative runs were conducted employing 10 percent volume solutions of paraffin wax and slack wax containing about 20% by weight oil in a film-spreading agent. Thus, in run 1 a ten percent volume solution of Texwax in n-pentane was prepared, as in Example I. Similarly, a ten percent volume solution of slack wax in n-pentane was used in run 2, and a ten percent volume of slack wax in naphtha was used in run 3. Water evaporation tests were conducted, substantially as described in Example I, and the results for each run as set forth in the table below.

Table II

| Run No. | Film Former | Film Spreading Agent | Amt. of Film Former, grams per sq. ft. | Percent Reduction of Evaporation |
|---|---|---|---|---|
| 1 | paraffin wax | n-pentane | 0.25 | 30.0 |
| 2 | slack wax | do | 0.25 | 62.4 |
| 3 | do | naphtha | 0.25 | 71.4 |

The results clearly illustrate the superiority of our film forming composition as compared to a two-component system employing only wax and a light hydrocarbon.

EXAMPLE III

For this example, a paraffinic oil oxidate having a Neut. No. between 60 and 80, a Sap. No. between 130 and 155 and an S.U.S. viscosity at a 210° F. of 75 to 100 was incorporated with the slack wax in a 1:1 ratio. A ten volume percent solution of the slack wax-oxidate in naphtha was prepared, and applied to 4,000 milliliters of water contained in an evaporating dish measuring 12.5 inches in diameter in the amount of 0.04 gram of film-former per square foot. Upon testing the vapor inhibiting properties of the film as in Example I, there resulted a 70.6% reduction in evaporation. In order to clearly illustrate the advantages of our film forming composition, a similar run was conducted using cetyl alcohol as the vapor barrier film in the amount of 0.04 gram per square foot. However, the percent reduction in evaporation was only 47.6 which is substantially lower than the percent reduction obtained with our composition.

We claim:

1. A method for inhibiting the evaporation of water which comprises contacting with the water a solution consisting essentially of wax selected from the group consisting of petroleum wax and natural wax, said wax having a melting point of from about 115° F. to 300° F.; mineral oil having a boiling point above 600° F., an S.U.S. viscosity at 100° F. of from 40 to 1,000 and an A.P.I. gravity of between 25 and 34; the ratio of said wax to said oil ranging from 20:1 to 1:20; and a hydrocarbon having not less than 5 carbon atoms per molecule and having a boiling point of from about 90 to 700° F.; said wax and said oil comprising 0.5 to 25% by volume of the resulting solution; whereby a vapor barrier film is formed on the exposed surface of the water.

2. A method according to claim 1 wherein said wax comprises a paraffin wax having a melting point of from about 120 to 185° F.

3. A method according to claim 1 wherein said hydrocarbon has from 6 to 16 carbon atoms per molecule.

4. A method according to claim 1 wherein said hydrocarbon has a boiling point of between 100 and 500° F.

5. A method according to claim 1 wherein said ratio of wax to oil is from 10:1 to 1:1.

6. A method according to claim 1 wherein said oil has an initial boiling point above 650° F., an S.U.S. viscosity at 100° F. of 50 to 800, and an A.P.I. gravity of between 26 and 32.

7. A method according to claim 1 wherein up to about 50% by weight of said wax may be replaced by an additive selected from the group consisting of polyisobutylene having a molecular weight of at least 300; polyethylene having a molecular weight of at least 300; acryloid polymer having a molecular weight of at least 1,000; polyvinyl ether having a molecular weight of at least 500; a polyvalent metal soap; alkyl-, aryl-, aralkyl-, and alkaryl-carboxylic acid having not less than 7 carbon atoms per molecule; and an ester having not less than 8 carbon atoms per molecule; said additive being substantially soluble in said mineral oil and said hydrocarbon and substantially insoluble in water.

8. A method according to claim 1 wherein said solution has incorporated therein up to 75% by volume, based on wax plus oil in said solution, an oxidate material selected from the group consisting of an oxidate derived from a deoiled macrocrystalline wax and having a Neutralization No. between 70 and 95, a Saponification No. between 210 and 250, a Neutralization No. to a Saponification No. ratio between 0.3 to 0.4 and an unsaponifiable content between 30 and 35 percent, and an oxidate derived from a paraffinic lubricating oil and having a Neutralization No. between 60 and 80, a Saponification No. between 120 and 165, an S.U.S. viscosity at 210° F. of less than 100 and a Lovibond ½ inch cell color rating of less than 100.

9. A method according to claim 8 wherein said oxidate material is incorporated in said solution in the ratio of between 0.01:1 to 2:1 of oxidate material to wax plus oil.

10. A method according to claim 9 wherein said ratio of oxidate material to wax plus oil is 0.1:1 to 1:1.

11. A film-forming composition consisting essentially of wax selected from the group consisting of petroleum wax and natural wax, said wax having a melting point of from about 115° F. to 300° F.; mineral oil having a boiling point above 600° F., an S.U.S. viscosity at 100° F. of from 40 to 1,000 and an A.P.I. gravity of between 25 and 34; the ratio of said wax to said oil ranging from 20:1 to 1:20; and a hydrocarbon having not less than 5 carbon atoms per molecule and having a boiling point of from about 90 to 700° F.; said wax and said oil comprising 0.5 to 25% by volume of the resulting solution; said film-forming composition being characterized by the ability to spread on the surface of water when contacted therewith thereby forming a vapor barrier film which is substantially continuous.

12. A film-forming composition according to claim 11 having incorporated therein an additive material selected from the group consisting of an oxidate derived from a deoiled macrocrystalline wax and having a Neutralization No. between 70 and 95, a Saponification No. between 210 and 250, a Neutralization No. to a Saponification No. ratio between 0.3 and 0.4 and an unsaponifiable content between 30 and 35 percent, and an oxidate derived from a paraffinic lubricating oil and having a Neutralization No. between 60 and 80, a Saponification No. between 120 and 165, an S.U.S. viscosity at 210° F. of less than 100 and a Lovibond ½ inch cell color rating of less than 100, the ratio of said oxidate material to said wax plus oil in said film-forming composition being 0.1:1 to 2:1.

13. A film-forming composition according to claim 11 having incorporated therein an additive replacing up to about 50% by weight of said wax, said additive selected from the group consisting of polyisobutylene having a molecular weight of at least 300; polyethylene having a molecular weight of at least 300; acryloid polymer having a molecular weight of at least 1,000; polyvinyl ether having a molecular weight of at least 500; a polyvalent metal soap; alkyl-, aryl-, aralkyl-, and alkaryl-carboxylic acid having not less than 7 carbon atoms per molecule; and an ester having not less than 8 carbon atoms per molecule; said additive being substantially soluble in said mineral oil and said hydrocarbon and substantially insoluble in water.

14. A film-forming composition consisting essentially of wax selected from the group consisting of petroleum wax and natural wax, said wax having a melting point of from about 120° F. to 185° F.; mineral oil having a boiling point above 650° F., an S.U.S. viscosity at 100° F. of from 50 to 800 and an A.P.I. gravity of between 26 and 32; the ratio of said wax to said oil ranging from 10:1 to 1:1; and a hydrocarbon having from 6 to 16 carbon atoms per molecule and a boiling point of from about 100 to 500° F.; said wax and said oil comprising 1 to 25% by volume of the resulting solution; said film-forming composition being characterized by the ability to spread on the surface of water when contacted therewith thereby forming a vapor barrier film which is substantially continuous.

No references cited.